United States Patent [19]

DeHaitre

[11] 4,019,550
[45] Apr. 26, 1977

[54] SEALING NUT WITH NYLON INSERT
[75] Inventor: Lon DeHaitre, Arlington Heights, Ill.
[73] Assignee: Abbott Screw & Mfg. Co., Chicago, Ill.
[22] Filed: June 9, 1975
[21] Appl. No.: 584,922
[52] U.S. Cl. .................................................. 151/7
[51] Int. Cl.² .......................................... F16B 39/34
[58] Field of Search ............ 85/1 JP, 32 R; 151/7, 151/38; 277/166; 285/212, 220, 355; 403/288; 220/288, 85, 32 R

[56] References Cited
UNITED STATES PATENTS

| | | | |
|---|---|---|---|
| 2,450,694 | 10/1948 | Sauer | 151/7 |
| 2,751,806 | 6/1956 | Dickie | 85/1 JP |
| 3,001,567 | 9/1961 | Brill | 151/7 |
| 3,030,997 | 4/1962 | Collins | 151/7 |
| 3,168,321 | 2/1965 | Glicksman | 85/1 JP X |
| 3,265,107 | 8/1966 | Glicksman | 151/7 |
| 3,316,952 | 5/1967 | Hollinger | 285/212 X |
| 3,399,589 | 9/1968 | Breed | 85/1 R |
| 3,520,342 | 7/1970 | Scheffer | 151/7 |
| 3,550,498 | 12/1970 | Briles | 151/7 X |
| 3,557,654 | 1/1971 | Weidner | 151/38 X |
| 3,572,414 | 3/1971 | Onufer | 85/1 JP |
| 3,622,167 | 11/1971 | Velthoven | 151/7 X |
| 3,635,272 | 1/1972 | Scheffer | 151/7 |

Primary Examiner—Roy D. Frazier
Assistant Examiner—Rodney H. Bonck
Attorney, Agent, or Firm—Silverman & Cass

[57] ABSTRACT

A sealing nut having a shouldered insert of heat stabilized-lubricated nylon with a protruding crown, locked into a recess provided at one end of the nut body by means of a coined lip engaging the shoulder. Sealing is effected when the nut is engaged on a threaded male member and screwed against a bearing surface through which the male member extends by exterior folding of the crown upon itself and confining the resulting fold within the lip, said lip being brought into metal-to-metal engagement with the bearing surface.

15 Claims, 5 Drawing Figures

SEALING NUT WITH NYLON INSERT

BACKGROUND OF THE INVENTION

The invention herein is concerned generally with sealing nuts and more particularly with a sealing nut having the ability to withstand extremely high pressures.

The particular environment in which the nut of the invention is intended for use is one which poses stringent requirements. The environment comprises a hydraulic chamber which is subject to internal pressures above 20,000 p.s.i. having a threaded stud or other threaded member extending through a threaded passageway in the wall of the chamber, it being desired from time to time to rotate the threaded stud for reasons which are of no concern to this invention. Hydraulic fluid deteriorates many substances; the environment may be subject to heat which may reach over 90° C; the nut may have to be loosened and tightened often; the pressure may have to be contained over a considerable length of time. There are other considerations related to the general need for a locking and sealing nut of this kind.

The sealing nut of the invention has a wide range of utility in other environments as well as the particular one which is mentioned above, this being in connection with hydraulic brake systems for highway vehicles.

Prior sealing arrangements have included many different types of structures which had various disadvantages. These need not be exhaustively discussed, but a brief mention of some will emphasize the advantages of this invention.

The so-called elastic stop nut structure which is generally represented by the embodiment described in U.S. Pat. 2,450,694 was primarily intended as a locking device. Its nylon insert was unthreaded so that when first used the thread was formed by the act of screwing the nut home. This gave a small degree of sealing, but only between the male threaded member and the nut. This type of nut is not readily "spun" either in installing or removing the same since the thread-to-thread clearance at the insert is practically nothing. These nuts are not as effective in re-use as they are for their initial use. Threading the nylon insert during manufacture substantially eliminates their locking and sealing abilities.

The use of a non-threaded insert in large nuts makes these nuts difficult to install and remove.

It is clear that there is no sealing ability for the elastic stop nut in any assembly of the type which has been referred to at the outset of this discussion, that is, at the axial end when the nut is brought into engagement with a bearing surface through which the threaded male member protrudes. Washers or other means are required to effect such sealing. Besides the inconvenience of handling, such means may be destroyed or rendered non-reusable when the amount of torque applied is high as in the case of vary high pressure installations. For example, a ⅝ inch nut of the invention is installed initially with a torque of between 50 and 70 foot-pounds. This will extrude many types of compounds which would be used as washers.

The art has gone to the confining of the sealing member, this being disclosed in U.S. Pat. No. 3,265,107, 3,572,414 and 3,635,272. These structures utilize inserts of a material which is generally extrudable in order to press portions of the insert into engagement with the various parts of the assembly.

In U.S. Pat. No. 3,265,107 the sealing to be effected is in the opening of a sheet metal member and the insert is resilient, being of silicone rubber or the like. It is hence readily distortable and capable of being configured to radically different shapes compared with its original one. For high pressures and an insert made of stiff nylon, even though the material permits a degree of cold flow, this structure would not be practical. the type of nylon required for high pressure arrangements is not readily compressible, if at all, and it is likely to shear before the metal-to-metal contact is achieved if a structure like that of this patent were attempted. Compressing the nylon would take enormous torque.

In U.S. Pat. No. 3,572,414 the insert is made of a low durometer urethane rubber and the need for preventing almost liquid flow of this material from its confining recess dictates a structure that leaves little of the material for sealing purposes. The use of such material and the structure disclosed in high pressure installations would be ineffectual.

In U.S. Pat. No. 3,635,272 the insert is bonded into its recess by pre-molding and then heating the nut. This is an expensive process and could well change the physical characteristics of the nut — especially if the temperature must be elevated enough to seal an insert of small size in a large nut. In addition to that disadvantage, the material used is said to be nylon or other polyamide resin capable of flowing under pressure into six recesses circumferentially arranged around the nut. A stiff material such as needed in high pressure installations would not flow as readily. In an installation such as intended by this patent, where the bolt shank enters a drilled passageway and not into a threaded passageway, if the insert were of the stiff type needed for high pressure, the corner of the passageway, although chamfered, would be likely to punch a ring out of the insert before it permits it to flow as described.

The inserts of two of the above mentioned prior art patents cannot be threaded internally unless they are bonded in place, because otherwise they will rotate if attempt is made to tap them when the nut is tapped. Threading them apart from the nut is impractical because the threads would not match those of the nut when assembled. Only U.S. Pat. No. 3,572,414 shows the insert locked in place, and it is not internally threaded.

As will be explained, the insert of the nut of the invention is formed independently of the nut body and before the nut body is tapped. It is formed of a type of nylon which has a lubricant that is compounded in it primarily for the purpose of enabling it to release readily from molds. Coincidentally, the lubricating qualities assist in the taking up of the nut during its last stages of installation. Such a material cannot be molded and bonded into a recess as proposed by the prior art because it will fall out. Certainly if attempted to be secured by some expensive means such as adhesive it cannot help but be displaced during the tapping process.

To have a substantial protruding part and still secure the insert mechanically into the nut body while at the same time providing a space for the displacement of the protruding part during installation is not taught by the prior art so far as known. The displacement is a substantial one in order to effect the seal and lock and the way of doing this with a stiff insert material and without raising other problems is also not taught in said prior art.

The structures of the prior art which involve the use of confined inserts have not displaced one of the principal methods of assuring a seal in the high pressure hydraulic field. The method in common use at this time involves forming a recessed seat in the surface of the body through which the male threaded member is to be screwed, surrounding and coaxially with the threaded member. An O-ring or other sealing member to be confined is installed in the recess and adapted to be compressed by the nut, either with or without a washer. Several such O-rings may be used. This type of structure is expensive and the O-rings must be replaced frequently.

The invention herein is ideally suited for use in the high pressure hydraulic field, but its principles are applicable in other fields where the requirements to achieve sealing are not as great. This is because of the great economy and effectiveness. This is true aside from the fact that it eliminates the need for surface recesses, washers and O-rings.

The most important difference between the sealing nut of the invention and the prior structures is that the substantial protrusion of the insert (called a "crown") herein is not intended to be only extruded and/or compressed during the take-up action of the nut, as in the prior art, but instead is folded outwardly upon itself initially. Thus, a substantial displacement is achieved without the need for expenditure of large amounts of energy, meaning that great torques need not be applied in the early stages of assembly. The crown is made relatively narrow, i.e., measured radially, so that there is enough space to enable the formation of a shoulder to provide for securement of the insert into a socket by coining a lip onto the shoulder while still leaving space (called a "gallery") for the folded end of the crown to seat. After this had occurred and the axial end of the lip approaches the metal-to-metal contact desired, the body of the insert is compact ready to receive the pressure for causing the necessary cold flow to effect sealing. At this time, the maximum of torque is applied.

The manufacture of the nut is highly economical since the inserts are modled molded in production, the nut bodies formed in a manner not differing substantially from that used to make the bodies of elastic stop nuts, the inserts installed in the sockets, the lips coined and the nuts tapped.

As stated above, the nut of the invention is especially intended for use in the high pressure hydraulic field but its principles are also applicable in circumstances where the requirements are less stringent. This should not be considered to detract from the many features and advantages which are achieved specifically in the high pressure hydraulic field.

In order to indicate the benefits and advantages of the nut of the invention when used in the high pressure hydraulic field there follows a list of the features achieved through the practice of the invention in that field. In considering this list, it will be apparent that the nut of the invention is also applicable where instead of a so-called "wet" environment existing on the interior of a chamber through the wall of which a threaded male member is adapted to be screwed, the environment may be "dry" but under gaseous pressure. Unless the gas is corrosive, the problem of the deterioration of the insert caused by hydraulic fluids and the like is eliminated.

The features which are set forth are the principal ones, there being many others of a minor and indirect nature (not necessarily in the order of importance):

1. The sealing material is rugged, stiff, durable and yet has a sufficient degree of flow to achieve the necessary sealing and locking.
2. There is a substantial displacement of the crown of the insert without requiring undue torque and without damaging the insert during such displacement.
3. The insert is permanently locked into the body of the nut, this being accomplished by machinery and methods used to form elastic stop nuts of conventional construction.
4. There is a space (gallery) into which the displaced portion of the crown enters toward the end of the take-up action.
5. There is a metal-to-metal contact of the nut body against the bearing surface after the nut has been fully taken up at which time the insert material is fully confined and has been forced to flow into the areas where the sealing must be effected.
6. The nut and its insert are tapped with a continuous thread during manufacture so that the nut can be spun on the male threaded member to the point where the actual taking up can be commenced.
6. The nut is reusable in that notwithstanding it has been torqued home and has effected a seal and a locking, it can be unscrewed readily, is readily backed off without the need for application of any substantial torque and can thereafter be reinstalled with as much sealing and locking efficiency as before.
8. The seal is such as to withstand extremely high pressures without leakage.
9. The nut has an indefinite shelf life since the insert material does not deteriorate. This also means that when installed and maintained under pressure for a long period of time there is no relaxation which could give rise to leakage because, in addition to the nature of the material of the insert, it is confined and not readily capable of cold flowing past the limits established by the act of compression in achieving the metal-to-metal contact.

It should again be emphasized that the economy with which the nut of the invention can be made and its effectiveness make it well suited to form other applications in addition to sealing in the high pressure hydraulic field.

SUMMARY OF THE INVENTION

A sealing nut having a shouldered insert with a protruding crown locked into a recess provided at one end of the nut body by means of a coined lip engaging the shoulder. The insert is tapped when the nut bore is tapped to form an integral threaded combination which provides unobstructed spinning during installation and removal of the nut from a threaded stud or the like. There is an annular gallery formed between the inner circumference of the lip and the crown during fabrication through proper choice of dimensions into which the crown moves during axial application of pressure thereon as in turning the nut upon a stud in a manner to move the said crown axially against a bearing surface through which the stud extends. This movement is effected by the inversion of the crown end upon itself, resulting in a turtle-neck-like fold of the crown. The total volume and configuration of the crown are such that there is some compression of the insert just before the axial end of the lip engages the bearing surface, it being intended that there be a metal-to-metal engagement when the nut has been fully torqued to its sealed and locked condition. This compression forces portions of the insert into the thread-to-thread clearances of the stud and nut, into the countersunk entrance to the threaded passageway of the body of the bearing surface and seals and locks the stud in place with great efficiency.

DESCRIPTION OF THE PREFERRED EMBODIMENT

Basically the invention is concerned with a sealing and locking nut having an insert of a relatively stiff nylon in which the insert protrudes and folds over upon itself when the nut is engaged against a bearing surface. This gives rise to the several advantages which have been described and enable the nut to be made in an economical way with a structure that provides highly efficient sealing and locking.

Figure 1:
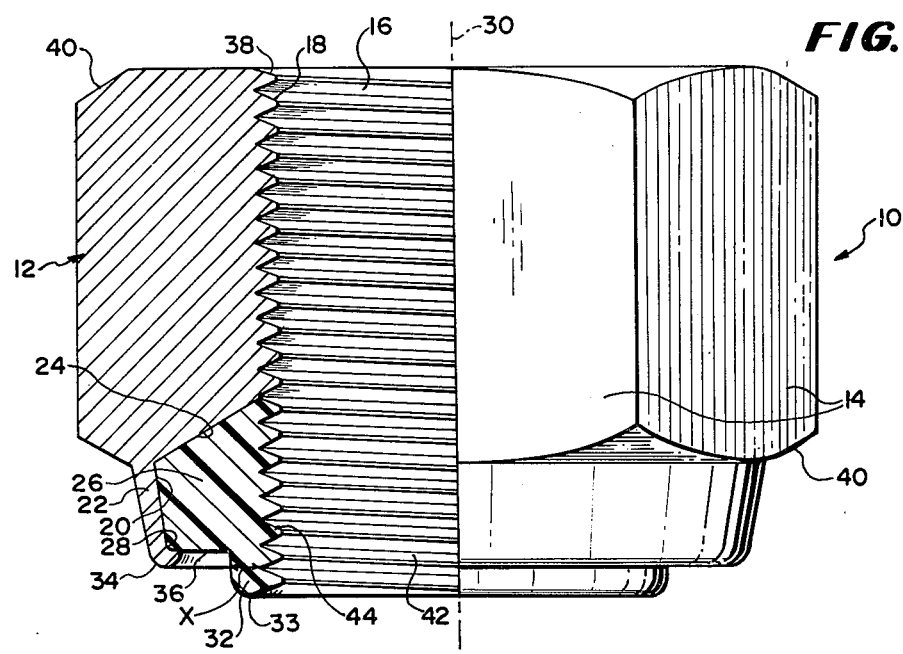
FIG. 1 is a side elevational view of a locking and sealing nut constructed in accordance with the invention, half of the nut being shown in section and the nut being shown in the condition it has before it has been put into use.
Figure 2:
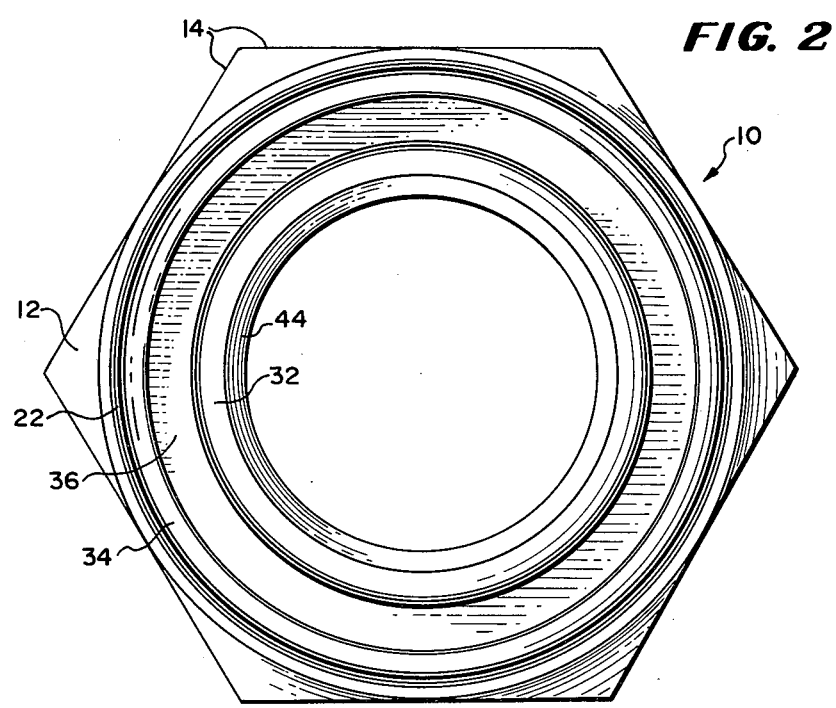
FIG. 2 is a plan view of the nut of FIG. 1 taken from the bottom or insert end thereof.

The nut of the invention is designated 10 and shown in FIGS. 1 and 2 in its condition prior to use, after it has been fabricated. In the fabrication techniques are used which have been known in and of themselves and thus machinery is available for such economical manufacture. The nut comprises a nut body 12 having conventional hexagonal facets 14 to enable its being engaged by a suitable spanner or wrench. There is a central threaded bore 16 whose metal threads are shown at 18 in the upper part of the nut 10 as viewed in FIG. 1. The nut 10 is formed with an annular interior socket 20 defined by an annular, integral, generally axially extending wall 22 on the bottom end of the nut body 12 and a conically tapered surface 24. The recess 20 is drilled out during the fabrication of the nut body 12. The outer diameter of the wall 22 is at most slightly less than the diameter across opposite flat facets.

In the recess there is provided an insert 26 in the form of a ring of generally irregular cross section, the insert being molded independently of the nut body 12 and initially formed with a shoulder 28 lying in a plane normal to the axis of the nut 10. For convenience the axis is shown by a broken line and is designated 30. The insert 26 has an annular protrusion at its lower end which is called a crown 32 and extends axially beyond the wall 22 and hence protrudes substantially from the lower end of the nut 10. The axial end of the wall 22 is in the form of a hooked lip 34 that engages against the axial end of the shoulder 28 and thereby forms a gallery 36 between the crown 32 and said lip 34. The crown end is rounded as shown at 33.

The upper end of the bore 16 is slightly countersunk at 38 and the outer corners of the nut are chamfered as at 40 in accordance with conventional design practices.

The insert 26 is permanently locked in place by the wall 22 and the lip 34 and its bore 42 is threaded as at 44 with the identical thread 18. This is accomplished by assembling the nut body 12 and the insert 26 with the bores 16 and 42 unthreaded and thereafter tapping both bores in a single operation.

In the manufacture of the nut 10 the body 12 is made on conventional screw machine apparatus independently of the insert 26. The outer circumference of the insert and the inner circumference of the wall 22 at this time are of right cylindrical configuration. The wall is longer than shown since the lip 34 is not yet formed. The dimensions are such that the insert 26 is readily telescoped into the recess 20 in an easy slide fit. After this preliminary assembly, the nut 10 is placed in a suitable press and the free end of the wall 22 is coined over and upon the shoulder 28. In this process the wall 22 is constricted somewhat and thus applies internal pressure against the insert. It then assumes the generally slight tapered configuration which it has in the drawings.

The insert 26 is made of a relatively stiff, high durometer nylon. The material which has been used for the specific application to the high pressure hydraulic field is described as heat stabilized-lubricated 66 nylon. This material is sold commercially under the trademark "Zytel 103 HS1L" by E. I. Du Pont de Nemours. The lubricant may be a silicone, but in any event it assists in the removal of the molded parts from their molds and assists in the easing of friction during installation and removal of the nut. It is heat retardant to a temperature of about 105° C. Its stiffness and memory make it ideally suited for the purpose of the invention.

In the course of use of the nut 10, the crown is outwardly inverted upon itself in a turtle-neck-like fold which is then packed down into the gallery 36. Pressure upon the insert thereafter effects the sealing and locking function.

Figure 3:
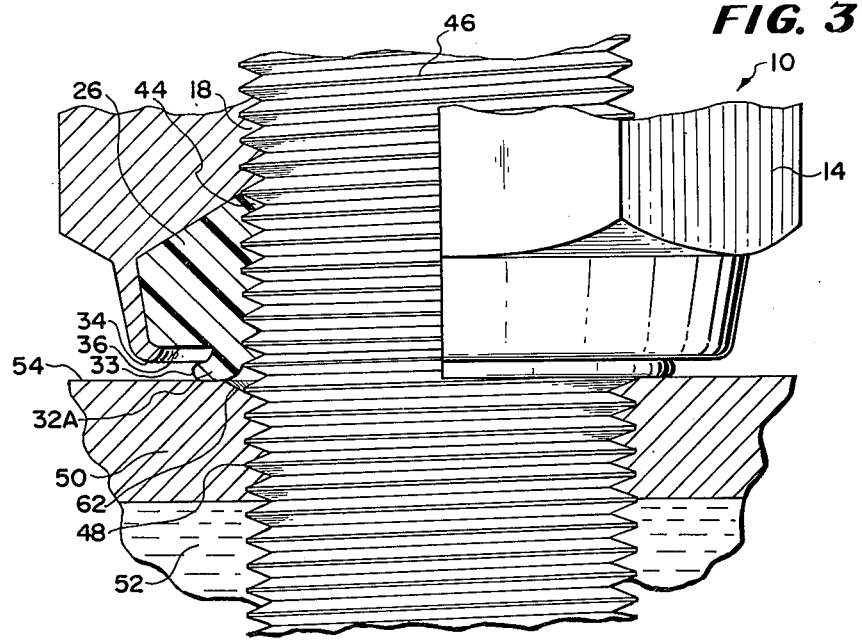
FIG. 3 is a fragmentary sectional view of the nut of the invention with portions shown in elevation, in the process of being installed into engagement with the bearing surface of a metal body containing pressurized fluid, the nut having been partway screwed onto a threaded male member.

In FIG. 3, the nut 10 has been engaged upon a threaded stud or bolt 46 which in turn is engaged in a threaded passageway 48 of a body 50 designed to contain some fluid 52 such as hydraulic fluid at high pressure. The stud 46 might be any form of adjusting member, mechanism operating device or even a fastener which is required to enter the interior of the body 50 which requires that none of the fluid 52 escape past the stud 46 through the passageway 48. Likewise, it is desired to lock the stud 46 from rotating or vibrating loose.

According to the invention, it is intended that the nut 10 be screwed home against the bearing surface 54 of the body 40 in such a manner as to seal and lock the joint represented by the stud 46 and the body 50. Since the threads 18 and 44 have been cut at the same time to the proper dimensions and clearance to fit the thread of the stud 46, when the nut 10 is first engaged on the stud 46, it will spin freely along the stud to the point where the free end of the crown 32 just touches the bearing surface 54. (It is presumed that the bearing surface 54 is metal such as steel and that the body 12 of the nut is also steel.)

The next step in the procedure of tightening the nut is to apply a wrench or spanner to the facets 14 and turn the nut clockwise (looking down onto the surface 54 for a right-hand thread). The first thing that happens is that the crown 32 starts to spread radially outward as it is forced against the bearing surface 54. This is assisted by the rounded end 33 sliding on the surface 54. This condition about half-way through the tightening process is shown at 32-A in FIG. 3. The inner surface of the crown 32 must expand slightly in order for this to occur and the crown 32 must be capable of bending. This must be done without any breakage for example along the roots of the threads 44 in the vicinity of the crown 32.

Figure 4:
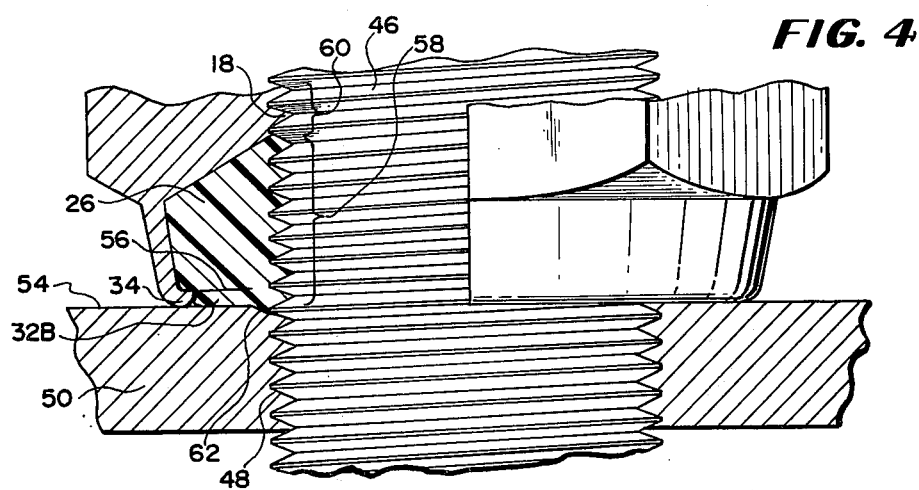
FIG. 4 is a view similar to that of FIG. 3 but showing the nut of the invention fully screwed home and sealing the joint represented by the male threaded member and the metal body.

The 66 nylon which is used is fully capable of accomplishing this. The dimension at X in FIG. 1 being relatively narrow compared to the overall diameter and the axial length of the crown provides sufficient flexibility. For example, in a nut having a ⅝ inch tapped thread of 18 threads per inch, the outer diameter of the crown was about 0.78 inch and the amount protruding axially beyond the lip 34 was about 0.085 inch. This particular nut was one which used a so-called heavy pattern, the dimension across the flats of the facets 14 being about 1.05 inch.

continuing with the explanation of the inversion of the crown 32, the torque which is required to start this inversion is relatively less than the final torque which will be applied. It is less than that which would be required to crush the insert and thereby force it to flow into interstices where it might be desired. The application of torque is continued until the crown 32 is fully pressed into the gallery 36 as shown at 32B in FIG. 4. Just before the end of the lip 34 engages the surface 54, the complete fold has taken place and the line of fold is shown at 56. This has been referred to as a turtle-neck-like fold. It results from an inversion of about 90° for the crown 32, which while it is not a complete reverse fold is nevertheless quite substantial for a synthetic resinous material and unique, so far as known, for any type of nut insert.

The volume of the crown 32 that will be pressed into the gallery 36 is chosen, easily by trial and error, to be more than enough to fill the gallery before the free end of the lip 34 engages the bearing surface 54. This means that as the last turn or turns of the wrench are being applied, the body of the insert 26 has tremendous pressure applied to it tending to make it expand. Through cold flow, the material of the insert 26 is forced into the threads of the stud 46 in the area 58; into the clearance space between the threads 18 and the threads of the stud 46 in the area 60; and also into the countersink 62 that is formed in the entrance of the passageway 48. This effects both a sealing and a locking of the stud 46 in place.

In a joint such as described, using a ⅝ × 18 sealing nut of the dimensions mentioned above, that is, with the heavy design of the nut body 12, withstood over 30,000 p.s.i. in a test of hydraulic equipment without failure or leakage.

The nut of the invention is reusable, as explained. Thus, if the stud 46 has to be turned temporarily, the nut 10 may be backed off until the insert is relieved of pressure after which the stud may be rotated and the nut 10 retorqued to seal and lock with substantially the same effectiveness as before. It has been found that after the nut has been in place and under pressure for a period of time it can be completely removed from the joint and later reused. The configuration of the insert is changed, but not to a degree that renders the nut useless. Due to the remarkable "memory" of polyamide resin, the crown 32 will slowly tend to return towards its original configuration, although it may never reach the same.

Figure 5:
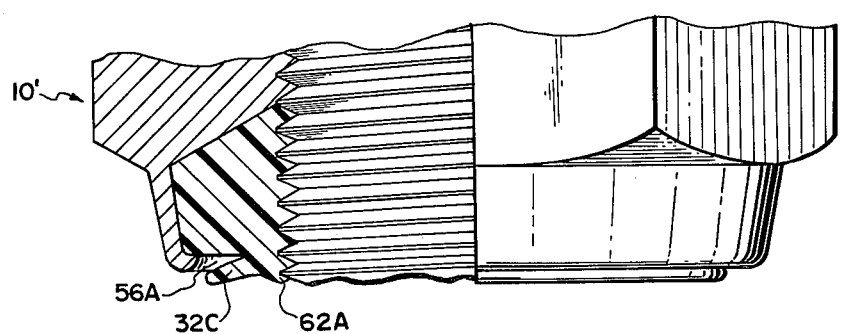
FIG. 5 is a fragmentary sectional view of the nut of the invention but showing the same some time after it has been removed from a joint such as that of FIG. 4.

In FIG. 5 there is shown a nut 10 which has the configuration of a crown at 32C which had been compressed to its folded condition and subjected to very substantial pressures for a period of time. It will be noted that the fold 56 has now opened up and can be seen at 56A and that there is an annular protrusion at 62A. This represents the portion of the insert that was forced into the countersink 62.

The nut 10' can be reused effectively on the same joint from which it was removed.

Considerable variations are capable of being made in the structure of the invention without departing from the spirit or scope as defined in the appended claims.

What it is desired to secure by Letters Patent of the United States is:

1. A sealing nut which is adapted to be screwed onto a male threaded stud or the like and brought into axial end engagement with the bearing surface of a body through which the stud threadedly extends in order to seal the joint defined by the stud and body and to lock the nut onto the stud while the joint is so sealed, the nut comprising:
    A. a nut body of metal having a central independently fabricated insert of a relatively stiff, high durometer polyamide resin arranged coaxially therewith and at one end thereof,
    B. the body and insert being locked together and there being a continuous threaded bore in the nut with a portion of the bore being in the body and a portion of the bore being in the insert,
    C. the insert having a shoulder at an axial end thereof and the body having an integral, generally cylindrical wall terminating at said one end in an angular radially inwardly bent over lip engaging the shoulder to provide for said locking of said insert, said insert additionally having an axially extending, integral relatively thin crown adjacent the insert bore and having at least a portion of said threaded bore on the inner surface of said crown which is spaced radially inward from the lip to provide an annular axially facing gallery between lip and crown,
    D. the lip being the limit to which the nut body extends axially at said one end,
    E. the axial length of the crown before the nut has been used being such that the free end thereof is spaced substantially beyond the lip in an axial direction away from the nut body,
    F. the crown being inverted in a radially outward direction when pressed axially against a bearing surface by screwing said nut towards said surface such action tending to produce a turtle-neck-like fold and bringing a substantial portion of the crown end into the gallery to occupy substantially all of said gallery.

2. A nut as claimed in claim 1 in which the volume of the gallery and the volume of the folded portion of the crown are so related that there is insufficient space for all of said folded portion when the nut has been screwed against the bearing surface with the lip in metal-to-metal engagement with said surface, the resulting pressure on said insert forcing it to cold flow into available interstices.

3. A nut as claimed in claim 2 in which the resin is nylon.

4. A nut as claimed in claim 2 in which the resin is a heat stabilized-lubricated 66 nylon.

5. A nut as claimed in claim 1 in which the free end of the crown is rounded.

6. A nut as claimed in claim 1 in which the insert has an exterior cylindrical surface and an annular flat surface at said axial end which is in a plane normal to the axis of the threaded bore, the crown protruding out of the flat surface at the radial inner edge thereof, the shoulder being formed by the juncture of the cylindrical surface and flat surface, the cylindrical wall of the body being in engagement with the exterior cylindrical surface of the insert and the lip engaging onto the outer edge of the annular flat surface so that the gallery is formed on the unobstructed portion of the annular flat surface.

7. The nut as claimed in claim 6 in which the resin is a heat stabilized-lubricated 66 nylon.

8. A sealing nut which is adapted to be screwed onto a male threaded stud or the like and brought into axial end engagement with the bearing surface of a body through which the stud threadedly extends in order to seal the joint defined by the stud and body and to lock the nut onto the stud while the joint is so sealed, the nut comprising:
  A. a metal nut body having a generally conventional solid axial end and having an annular socket provided at its second axial end, the nut body having a through axial bore, the annular socket being
    i. symmetrical with respect to the axis of the bore,
    ii. formed by the interior cylindrical surface of an axially extending generally cylindrical wall integral with said nut body and a second interior surface of the body which intersects with said interior cylindrical surface whose radius extends generally at an angle with the axis of the bore,
    iii. open to the second axial end of the nut body and to the bore along the axial length of the socket,
  B. an annular symmetrical, independently fabricated insert of relatively stiff polyamide resin locked into the socket and having its exterior surface and its first axial end facing the solid axial end of the nut body configured snugly to seat against the interior cylindrical surface and the second interior surface of said body, said insert
    i. having a central axial bore formed as a continuation of the bore of said nut body, both bores being threaded by a continuous thread,
    ii. having a relatively flat annular surface formed at its second axial end providing a shoulder on the radially outer edge thereof and an annular axially extending crown at the radially inner edge thereof,
  C. the free end of the axially extending cylindrical wall of the nut body being bent over the shoulder and engaging upon a narrow area of said flat annular surface whereby to form a lip comprising the outermost extend of the metal of said nut body at said second axial end, and to lock the insert into the socket,
  D. the crown being radially spaced from the lip and having at least a portion of said threaded bore on the inner surface of said crown whereby to provide a gallery between the lip and the crown upon the flat annular surface of the insert,
  E. the crown extending in a radial direction away from the solid axial end of the nut body substantially beyond the lip, and
  F. the crown being folded outwardly when axial pressure is applied to the end thereof so that it inverts and is forced into the gallery.

9. A sealing nut as claimed in claim 8 in which the leading end of the crown is rounded.

10. A sealing nut as claimed in claim 8 in which the volume of the portion of the crown which is adapted to be forced into the gallery is somewhat greater than the volume of the gallery whereby to cause cold flow of other parts of the insert when all of the said portion of said crown is forced into said gallery.

11. A sealing nut as claimed in claim 8 in which said first axial end of the insert and the second interior surface of the body are of conforming conical configuration with the taper of the cone decreasing toward the solid axial end of the nut body.

12. A sealing nut as claimed in claim 8 in which the polyamide resin is a 66 nylon.

13. A sealed joint comprising:
  A. a metal body containing a fluid under pressure and having a threaded passageway extending through a wall of the body from the interior to the exterior thereof,
  B. a threaded member engaged in said passageway and having a stud-like portion on the exterior thereof,
  C. the body having a planar bearing surface surrounding the passageway on the exterior thereof,
  D. a combined sealing and locking nut threadedly engaged on the stud-like portion and having one axial end thereof in metal-to-metal engagement with said bearing surface, said nut comprising:
    i. a nut body having a socket in the one axial end,
    ii. a polyamide resin independently fabricated insert of substantial stiffness locked into the socket, there being a continuous threaded bore through the body and insert, the insert having a narrow annular extension having at least a portion of said threaded bore on the inner surface of said extension engaged against the bearing surface and inverted in an outward fold,
    iii. the nut body having a lip around the socket engaged upon and locking the insert in place, the lip providing the said metal-to-metal contact there being an annular gallery between the lip and the extension into which the outward fold is pressed and confined between the lip and stud-like portion, but said gallery being somewhat less in volume than said fold so that in the process of screwing the nut against the bearing surface the insert is subjected to compression force which cold flows portions of said insert against the stud-like portion and into clearances between said stud-like portion on the one hand and threads of the nut body and the threaded passageway on the other hand.

14. A sealed joint as claimed in claim 13 in which there is a countersink at the entrance to the threaded passageway on the exterior of the body and a portion of said insert also flows into said countersink.

15. A sealed joint as claimed in claim 13 in which said polyamide resin is 66 nylon.

* * * * *